US009836637B2

United States Patent
Merrell et al.

(10) Patent No.: US 9,836,637 B2
(45) Date of Patent: Dec. 5, 2017

(54) FINGER PRINT STATE INTEGRATION WITH NON-APPLICATION PROCESSOR FUNCTIONS FOR POWER SAVINGS IN AN ELECTRONIC DEVICE

(71) Applicant: Google Technology Holdings LLC, Mountain View, CA (US)

(72) Inventors: Thomas Y Merrell, Beach Park, IL (US); Jeffrey A Sierawski, Wauconda, IL (US)

(73) Assignee: Google LLC, Mountain View, CA (US)

( * ) Notice: Subject to any disclaimer, the term of this patent is extended or adjusted under 35 U.S.C. 154(b) by 66 days.

(21) Appl. No.: 14/310,927

(22) Filed: Jun. 20, 2014

(65) Prior Publication Data

US 2015/0199554 A1    Jul. 16, 2015

Related U.S. Application Data

(60) Provisional application No. 61/927,917, filed on Jan. 15, 2014, provisional application No. 61/972,487, filed on Mar. 31, 2014.

(51) Int. Cl.
*G06K 9/00*    (2006.01)
*G06F 21/32*    (2013.01)
(Continued)

(52) U.S. Cl.
CPC ......... *G06K 9/00033* (2013.01); *G06F 21/32* (2013.01); *G06F 21/81* (2013.01); *H04L 63/0861* (2013.01)

(58) Field of Classification Search
CPC ..... G06K 9/00033; G06F 21/32; G06F 21/81; H04L 63/0861
(Continued)

(56) References Cited

U.S. PATENT DOCUMENTS 4,807,162 A  *  2/1989  Shibayama ............ G05B 19/42
                                                 340/674
5,180,901 A  *  1/1993  Hiramatsu ......... G06K 9/00087
                                                 235/380
(Continued)

FOREIGN PATENT DOCUMENTS

CN          102052017 A  *  5/2011
CN          102808550 A  *  12/2012
(Continued)

OTHER PUBLICATIONS

IBM, "Fingerprint authentication and authorization for choosing PC configuration profiles", IPCOM000178910D, Jan. 29, 2009, 2 pages.*
(Continued)

*Primary Examiner* — Luu Pham
*Assistant Examiner* — Walter Malinowski
(74) *Attorney, Agent, or Firm* — McDermott Will & Emery LLP

(57) ABSTRACT

A system includes a fingerprint sensor, an application processor, and an auxiliary processor. The application processor is operable to arm the fingerprint sensor prior to the application processor entering a low power or sleep mode. The auxiliary processor is to receive a state output from the fingerprint sensor. The state output is to cause activation of one or more functions of the auxiliary processor upon fingerprint authentication while leaving the application processor in the low power or sleep mode.

13 Claims, 7 Drawing Sheets

(51) Int. Cl.
*G06F 21/81* (2013.01)
*H04L 29/06* (2006.01)

(58) Field of Classification Search
USPC .......................... 713/186; 726/19; 382/124
See application file for complete search history.

(56) References Cited

U.S. PATENT DOCUMENTS

| | | | | |
|---|---|---|---|---|
| 5,434,998 | A * | 7/1995 | Akai | G06F 11/20 709/213 |
| 5,832,240 | A * | 11/1998 | Larsen | H04Q 11/0471 710/105 |
| 6,408,058 | B1 * | 6/2002 | Lanet | H04M 11/066 178/18.01 |
| 6,705,972 | B1 * | 3/2004 | Takano | A63B 24/00 482/7 |
| 6,792,287 | B1 * | 9/2004 | Tuomela | G07C 9/00158 340/5.83 |
| 6,980,672 | B2 * | 12/2005 | Saito | G06K 9/00006 340/5.53 |
| 7,242,277 | B2 * | 7/2007 | Minemura | G06F 21/32 340/5.53 |
| 7,245,725 | B1 * | 7/2007 | Beard | G06F 1/3203 375/295 |
| 7,765,043 | B2 * | 7/2010 | Kobayashi | B05B 11/0016 180/65.1 |
| 8,311,514 | B2 * | 11/2012 | Bandyopadhyay | G06F 1/1643 455/410 |
| 8,327,158 | B2 * | 12/2012 | Titiano | G06F 1/3203 713/300 |
| 8,826,030 | B2 * | 9/2014 | White | H04L 63/08 713/168 |
| 9,277,500 | B1 * | 3/2016 | Solsona-Palomar | H04W 52/0229 |
| 2002/0146157 | A1 * | 10/2002 | Goodman | G07C 9/00158 382/127 |
| 2003/0091070 | A1 * | 5/2003 | Pail | H04Q 3/0025 370/532 |
| 2003/0101348 | A1 * | 5/2003 | Russo | G06K 9/00026 713/185 |
| 2003/0105798 | A1 * | 6/2003 | Kim | G06F 9/4812 718/105 |
| 2003/0135764 | A1 * | 7/2003 | Lu | G07C 9/00158 726/5 |
| 2003/0222144 | A1 * | 12/2003 | Meier | G06K 7/10574 235/454 |
| 2004/0179718 | A1 * | 9/2004 | Chou | G07C 9/00087 382/115 |
| 2004/0225901 | A1 * | 11/2004 | Bear | G06F 1/3203 713/300 |
| 2005/0113071 | A1 * | 5/2005 | Nagata | H04M 1/0214 455/411 |
| 2005/0207624 | A1 * | 9/2005 | Ehlers | G06K 9/00013 382/124 |
| 2005/0226479 | A1 * | 10/2005 | Takahashi | G06K 9/00026 382/124 |
| 2005/0246563 | A1 * | 11/2005 | Chandley | G06F 1/3203 713/320 |
| 2006/0064577 | A1 * | 3/2006 | Chiu | G06F 21/575 713/2 |
| 2006/0095647 | A1 * | 5/2006 | Battaglia | G06K 19/07703 711/100 |
| 2006/0233428 | A1 * | 10/2006 | Sakai | G06F 21/32 382/124 |
| 2007/0067674 | A1 * | 3/2007 | Essame | G06F 11/0796 714/14 |
| 2007/0076923 | A1 * | 4/2007 | Chiu | G06K 9/00013 382/124 |
| 2007/0198436 | A1 | 8/2007 | Weiss | |
| 2007/0226497 | A1 * | 9/2007 | Taylor | G06F 21/31 713/168 |
| 2007/0230936 | A1 * | 10/2007 | Kikuchi | G03B 13/18 396/125 |
| 2007/0236407 | A1 * | 10/2007 | Toorians | G06F 1/1616 345/1.1 |
| 2007/0239920 | A1 * | 10/2007 | Frid | G06F 13/4282 710/306 |
| 2008/0030301 | A1 * | 2/2008 | Terao | B60R 25/04 340/5.53 |
| 2008/0052710 | A1 * | 2/2008 | Iwai | G06F 21/305 718/100 |
| 2008/0059379 | A1 * | 3/2008 | Ramaci | G06Q 20/105 705/66 |
| 2008/0130165 | A1 * | 6/2008 | Partee | G11B 19/04 360/97.21 |
| 2008/0148375 | A1 * | 6/2008 | Yamamoto | G06F 21/32 726/7 |
| 2008/0155268 | A1 * | 6/2008 | Jazayeri | G06F 21/32 713/186 |
| 2008/0221592 | A1 * | 9/2008 | Kawai | A61B 1/0055 606/130 |
| 2008/0223925 | A1 * | 9/2008 | Saito | G06Q 20/341 235/380 |
| 2008/0253624 | A1 * | 10/2008 | Wong | G06F 1/26 382/124 |
| 2009/0082214 | A1 * | 3/2009 | Liu | G01N 33/548 506/9 |
| 2009/0279749 | A1 * | 11/2009 | Irving | G06K 9/0002 382/124 |
| 2009/0315675 | A1 * | 12/2009 | Yokota | G06F 21/32 340/5.83 |
| 2010/0039234 | A1 * | 2/2010 | Soliven | H04B 5/02 340/10.1 |
| 2010/0176823 | A1 * | 7/2010 | Thompson | G06K 9/00026 324/676 |
| 2010/0180136 | A1 | 7/2010 | Thompson et al. | |
| 2010/0192230 | A1 * | 7/2010 | Steeves | H04L 63/08 726/26 |
| 2010/0313050 | A1 * | 12/2010 | Harrat | G06F 1/3203 713/323 |
| 2011/0032206 | A1 * | 2/2011 | Kitamura | G06F 1/169 345/173 |
| 2011/0099623 | A1 * | 4/2011 | Garrard | H04L 63/126 726/14 |
| 2011/0231640 | A1 * | 9/2011 | Avadhanam | G06F 9/4403 713/2 |
| 2011/0231672 | A1 * | 9/2011 | Idani | G06F 21/6218 713/189 |
| 2011/0312349 | A1 * | 12/2011 | Forutanpour | G06F 1/1626 455/466 |
| 2011/0317886 | A1 * | 12/2011 | Matsuoka | G06F 21/32 382/124 |
| 2012/0046012 | A1 * | 2/2012 | Forutanpour | G06F 21/71 455/411 |
| 2012/0092293 | A1 * | 4/2012 | Ganapathi | G02B 26/0833 345/174 |
| 2012/0100895 | A1 * | 4/2012 | Priyantha | H04W 52/0293 455/574 |
| 2012/0174098 | A1 * | 7/2012 | Tanikawa | G06F 9/4825 718/1 |
| 2012/0185717 | A1 * | 7/2012 | Song | H04W 52/0251 713/323 |
| 2012/0242453 | A1 * | 9/2012 | Delgado | G06K 19/0705 340/10.1 |
| 2012/0254878 | A1 * | 10/2012 | Nachman | G06F 9/5094 718/102 |
| 2013/0014231 | A1 * | 1/2013 | Chu | H04L 63/0892 726/4 |
| 2013/0070636 | A1 * | 3/2013 | Farley | H04W 4/008 370/254 |
| 2013/0080795 | A1 * | 3/2013 | Sistla | G06F 1/324 713/300 |
| 2013/0129163 | A1 * | 5/2013 | Chung | G06K 9/228 382/124 |
| 2013/0141387 | A1 * | 6/2013 | Royhob | G06F 3/044 345/174 |

(56) References Cited

U.S. PATENT DOCUMENTS

| | | | | |
|---|---|---|---|---|
| 2013/0167226 A1* | 6/2013 | Lin | H04M 1/0256 | 726/19 |
| 2013/0173925 A1* | 7/2013 | Yen | G06F 21/32 | 713/186 |
| 2013/0207916 A1* | 8/2013 | Koo | H04N 5/64 | 345/173 |
| 2013/0234862 A1* | 9/2013 | Toth | H04Q 9/00 | 340/870.03 |
| 2013/0259329 A1* | 10/2013 | Wickboldt | H05K 1/189 | 382/124 |
| 2013/0318358 A1* | 11/2013 | Wang | G06F 21/31 | 713/182 |
| 2013/0329439 A1* | 12/2013 | Hellkamp | F21V 23/003 | 362/464 |
| 2014/0007227 A1* | 1/2014 | Morinaga | G06F 21/31 | 726/19 |
| 2014/0037109 A1* | 2/2014 | Ban | H03G 3/20 | 381/107 |
| 2014/0049883 A1* | 2/2014 | Kim | H02P 31/00 | 361/679.01 |
| 2014/0052300 A1* | 2/2014 | Matsuoka | F24F 11/0086 | 700/276 |
| 2014/0075178 A1* | 3/2014 | Trethewey | G06F 9/4421 | 713/100 |
| 2014/0094198 A1* | 4/2014 | Heo | H04W 52/028 | 455/456.4 |
| 2014/0115366 A1* | 4/2014 | Joo | G06F 1/06 | 713/323 |
| 2014/0129843 A1* | 5/2014 | Shi | G06F 21/32 | 713/182 |
| 2014/0149754 A1* | 5/2014 | Silva | G06F 1/3212 | 713/300 |
| 2014/0226879 A1* | 8/2014 | Westerman | G06K 9/00013 | 382/125 |
| 2014/0270415 A1* | 9/2014 | Alameh | G06K 9/00026 | 382/124 |
| 2014/0283142 A1* | 9/2014 | Shepherd | G06F 3/0482 | 726/30 |
| 2014/0351560 A1* | 11/2014 | Lautner | G06F 15/80 | 712/30 |
| 2015/0046679 A1* | 2/2015 | Gathala | G06F 9/46 | 712/30 |
| 2015/0062020 A1* | 3/2015 | Pourbigharaz | G06F 3/0416 | 345/173 |
| 2015/0127965 A1* | 5/2015 | Hong | H04L 9/3231 | 713/323 |
| 2015/0193062 A1* | 7/2015 | Wyatt | G06F 3/0412 | 345/173 |
| 2015/0194137 A1* | 7/2015 | Wyatt | G09G 5/393 | 345/173 |
| 2015/0282075 A1* | 10/2015 | Suga | H04W 4/005 | 370/311 |

FOREIGN PATENT DOCUMENTS

| | | | | |
|---|---|---|---|---|
| CN | 103049953 A | * | 4/2013 | |
| KR | 20150051888 A | * | 5/2015 | |
| WO | WO 0171671 A2 | * | 9/2001 | G06F 1/1626 |
| WO | 03007127 A2 | | 1/2003 | |
| WO | WO 03007127 A2 | * | 1/2003 | G06K 9/00026 |
| WO | 2007114960 A2 | | 10/2007 | |
| WO | WO 2007114960 A2 | * | 10/2007 | G06F 1/1613 |

OTHER PUBLICATIONS

"Device Authentication by Continuous or Repeated Ambient Biometric Data Collection", Jun. 24 2016, IPCOM000246655D, 5 pages.*

Debnath, "FlashStore: High Throughput Persistent Key-Value Store", Proceedings of the VLDB Endowment, vol. 3, No. 2, 2010, pp. 1414-1425.*

White Book working Group, "Recommended Practice for Electric Systems in Health Care Facilities", IEEE P602/D2, Sep. 2006, 380 pages.*

Shi, "Realization of Fingerprint Identification on DSP", ISICA 2009, LNCS 5821, Springer-Verlag, 2009, pp. 525-532.*

Aboalsamh, "A Potable Biometric Access device using Dedicated Fingerprint Processor", WSEAS Transactions on Computers, issue 8, vol. 9, Aug. 2010, pp. 878-887.*

Ojala, "Wearable Authentication Device for Transparent Login in Nomadic Applications Environment", 2008 International Conference on Signals, Circuits, and Systems, IEEE, 2008, pp. 1-6.*

Rai, "Power Agnostic Technique for Efficient Temperature Estimation of Multicore Embedded Systems", Cases'12, Oct. 7-12, 2012, pp. 61-70.*

PCT Search Report and Written Opinion issued in Application No. PCT/US2015/011407 dated Mar. 27, 2015.

Aboalsamh, "A Potable Biometric Access Device Using Dedicated Fingerprint Processor", WSEAS Transactions on Computers, Issue 8, vol. 9, Aug. 31, 2010 (Aug. 31, 2010), XP055177313, Retrieved from the Internet:URL:http://www .wseas.us/e-library/transactions/computers/2010/89 -883 .pdf [retrieved on Mar. 17, 2015], p. 878-p. 885.

Shi, et al., "Realization of Fingerpring Identification on DSP", Oct. 23, 2009 (Oct. 23, 2009), Advances Incomputation and Intelligence, Springer Berlin Heidelberg, Berlin, Heidelberg, pp. 525-532, XP019132535, ISBN: 978-3 -642-04842-5, p. 525-p. 531.

* cited by examiner

FINGER PRINT STATE INTEGRATION WITH NON-APPLICATION PROCESSOR FUNCTIONS FOR POWER SAVINGS IN AN ELECTRONIC DEVICE

CROSS REFERENCE TO PRIOR APPLICATIONS

This application claims priority and benefit under 35 U.S.C. §119(e) from U.S. Provisional Application No. 61/927,917, filed Jan. 15, 2014, which is incorporated by reference for all purposes. This application claims priority and benefit under 35 U.S.C. §119(e) from U.S. Provisional Application No. 61/972,487, filed Mar. 31, 2014, which is incorporated by reference for all purposes.

BACKGROUND

Technical Field

This disclosure relates generally to electronic devices, and more particularly to electronic devices with biometric sensors.

Background Art

Mobile electronic communication devices, such as mobile telephones, smart phones, gaming devices, and the like, are used by billions of people. The owners of such devices come from all walks of life. These owners use mobile communication devices for many different purposes including, but not limited to, voice communications, text messaging, Internet browsing, commerce such as banking, and social networking. The circumstances under which users of mobile communication device use their devices varies widely as well.

In using mobile communication devices for so many applications, a user is likely to have a wide variety of personal passcodes that are used to access the device, an application, or combinations thereof. Such passcodes are generally required to access personal information on an electronic device, access email, retrieve bank records, and so forth. Frequently these passcodes are required to meet strict security guidelines and can thus become lengthy and difficult to remember. Moreover, for security purposes, many devices and systems require the user to change each passcode on a regular basis. Accordingly, remembering all these passcodes can be difficult.

To alleviate this issue, some modern electronic devices are being equipped with biometric sensors. Rather than entering a passcode, a user touches or otherwise interacts with a biometric sensor to identify their self and access a device or particular application. While biometric sensors may eliminate the need to memorize many different passcodes, they are not without issues of their own. For example, securely protecting the biometric information is a paramount concern. It would be advantageous to have an improved system for accessing an electronic device, personal information, or applications operating on an electronic device.

Figure 1:
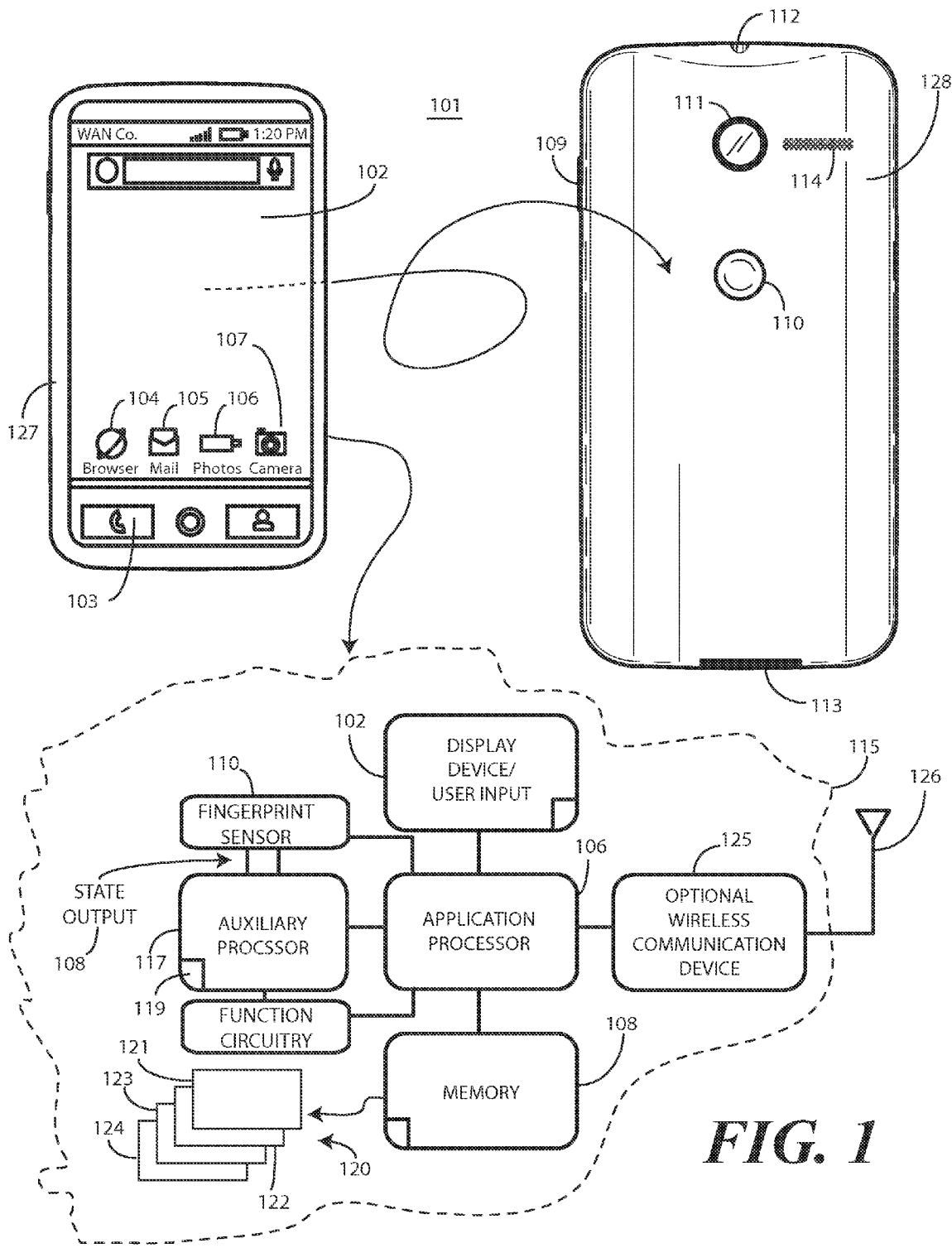
FIG. 1 illustrates one explanatory system configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to providing state output from a fingerprint sensor to one or more processors as described below. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of state output generation, processor or control circuit polling or actuation, or electronic device control by a fingerprint sensor as described herein. The non-processor circuits may include, but are not limited to, a radio receiver, a radio transmitter, signal drivers, clock circuits, power source circuits, and user input devices. As such, these functions may be interpreted as steps of a method to perform processor polling, feature actuation, or state output generation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a system that includes a fingerprint sensor and one or more processors. In one embodiment, the processors include an application processor and an auxiliary processor. The application processor can be configured to operate the primary applications of the system, including the operating system environment. The auxiliary processor, which in one embodiment is a low power processor, can be configured to operate ancillary functions, including output notification devices, user interface functions, and so forth.

In one embodiment, as the application processor is tasked with performing the secure information and application operating functions of the system, the application processor will consume relatively large amounts of power. By contrast, as the auxiliary processor may perform a limited number of non-secure functions, the auxiliary processor will be a smaller component and will consume far less power than the application processor. Accordingly, in one or more embodiments the application processor will enter a low power or sleep mode when the system is not in use. However, in one or more embodiments the auxiliary processor can remain in an operational state continually, even while the device is not in use.

Embodiments of the disclosure contemplate that power savings—and thus longer runtime on a single battery charge—can be achieved by causing the application processor to exit its low power or sleep mode only when necessary. Embodiments of the disclosure also contemplate that protecting the security of any fingerprint data received by the fingerprint sensor is a high priority. Thus, the fingerprint data should be protected within the fingerprint sensor and not transferred to other processors within the system.

To obtain longer battery runtime while protecting fingerprint data, in one embodiment the fingerprint sensor is to provide a state output to the auxiliary processor when a user touches or otherwise interacts with the fingerprint sensor. In one embodiment, this state output is provided only to the auxiliary processor. Thus, when the application processor is in a low power or sleep mode and a user interacts with the fingerprint sensor, the state output will be delivered to the auxiliary processor, thereby allowing the application processor to remain in the low power or sleep mode. As the auxiliary processor can be in a continually operational state, the auxiliary processor receives the state output and performs one or more functions in response to one or more states of the state output. The functions can include actuating user feedback devices, performing non-secure operations, and so forth.

Illustrating by example, in one embodiment when a user interacts with the fingerprint sensor, the fingerprint sensor delivers a first state output to the auxiliary processor. This first state output can indicate that the fingerprint sensor is in performing an authentication process on the data received from the user. Once the data is authenticated, e.g., once the fingerprint sensor authenticates that fingerprint data belongs to a predefined user, the fingerprint sensor may deliver a second state output to the auxiliary processor. This second state output can indicate that the data has been authenticated. Once this occurs, in one or more embodiments one or more functions of are activated by the auxiliary processor. In one or more embodiments these functions are activated while leaving the application processor in the low power or sleep mode. Examples of the one or more functions can include activation of an audible feedback device, a haptic feedback device, a visible feedback device, or combinations thereof.

Turning now to FIG. 1, illustrated therein is one explanatory system 100 configured in accordance with one or more embodiments of the disclosure. The system 100 includes an explanatory electronic device 101 in this embodiment. The explanatory electronic device 101 of FIG. 1 is shown as a smart phone for illustrative purposes. However, it should be obvious to those of ordinary skill in the art having the benefit of this disclosure that other electronic devices may be substituted for the explanatory smart phone to achieve the system 100 of FIG. 1. For example, a system 100 configured in accordance with embodiments of the disclosure could substitute a palm-top computer, a tablet computer, a gaming device, wearable computer, a media player, or other device for the smart phone that is used for illustrative purposes in FIG. 1.

This illustrative electronic device 101 includes a display 102, which may optionally be touch-sensitive. In one embodiment where the display 102 is touch-sensitive, the display 102 can serve as a primary user interface of the electronic device 101. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

In one embodiment, the display 102 is a high-resolution display. The term "high-resolution display" is used herein to refer to a display device that can present text and images to a user by altering a large number of pixels which, when viewed collectively by a user, form the presented text or image. The high-resolution display can be used for the presentation of text, information, and graphics on a mobile device with sufficient granularity as to be easily switched between graphics or text. For example, the high-resolution display could be one suitable for presenting an image in the Joint Photographics Expert Group (JPG) format to the user. Such displays generally are configured to turn on and off individual pixels by way of a display driver for the presentation of high-resolution information.

The explanatory electronic device 101 of FIG. 1 includes two housing members. A front housing member 127 is disposed about the periphery of the display 102. Said differently, the display 102 is disposed along a major face of the front housing member 127 in one embodiment. A rear-housing member 128 forms the backside of the electronic device 101 in this illustrative embodiment. Features can be incorporated into the housing members 127,128. Examples of such features include an optional camera 111 or an optional speaker port 114, which are show disposed on the backside of the electronic device 101 in this embodiment. In this illustrative embodiment, a fingerprint sensor 110 is disposed along the rear-housing member 128 on the backside of the electronic device 101. Note that in other embodiments, the fingerprint sensor 110 could be disposed along the front housing member 127 adjacent to the display 102 as well. In still other embodiments, the fingerprint sensor 110 could be disposed beneath the display 102, thereby allowing the user to place a finger on the display 102 for identification.

In one embodiment, the fingerprint sensor 110 can be a single function device. In other embodiments, the fingerprint sensor 110 can be a dual or multifunction device. Illustrating by example, in one embodiment the fingerprint sensor 110 is solely responsible for receiving biometric data from a user and either authenticating the user or determining that the user is unauthorized to use the electronic device 101. This would be a single function fingerprint sensor.

In other embodiments, the fingerprint sensor 110 may be capable of performing multiple functions. Again illustrating by example, in one embodiment the fingerprint sensor 110 can receive biometric data from a user and either authenticate the user or determine that the user is unauthorized to use the electronic device 101. However, the fingerprint sensor 110 may also be configured as a push button. Thus, by touching the fingerprint sensor 110 the user may deliver biometric data only. However, by touching and pressing the fingerprint sensor 110, the fingerprint sensor 110 may both authenticate the user by receiving the biometric data from touch input and perform a second function in response to the push button being depressed. An example of the second function may be causing the application processor 116 to exit a low power or sleep mode.

Where the fingerprint sensor 110 is instead a single function device, another user control, such as push button 109, may be included for performing the second function. Thus, in such an embodiment the user may touch the fingerprint sensor 110 to deliver biometric data and press the push button 109 or other user control to cause the application processor 116 to exit the low power or sleep mode. In one or more embodiments, simultaneous activation of the fingerprint sensor 110 and the push button 109 may be required. For example, a user may have to press the push button 109 with one finger while touching the fingerprint sensor 110 with another finger to access all operational features of the electronic device 101. In other embodiments, these processes, i.e., touching the fingerprint sensor 110 and pressing the push button 109, may need to be performed in a specific order to properly unlock the electronic device 101 and access the features of the application processor 116. In still other embodiments, no particular order of these processes may be required so long as both are performed within a predetermined time of each other. Other modes of unlocking an accessing the electronic device 101 will be obvious to those of ordinary skill in the art having the benefit of this disclosure.

In one embodiment, the electronic device 101 includes one or more connectors 112, 113, which can include an analog connector, a digital connector, or combinations thereof. In this illustrative embodiment, connector 112 is an analog connector disposed on a first edge, i.e., the top edge, of the electronic device 101, while connector 113 is a digital connector disposed on a second edge opposite the first edge, which is the bottom edge in this embodiment.

A block diagram schematic 115 of the electronic device 101 is also shown in FIG. 1. In one embodiment, the electronic device 101 includes one or more control circuits. In one embodiment, the electronic device includes an application processor 116 and an auxiliary processor 117. One or both of the application processor 116 or the auxiliary processor 117 can include one or more processors. One or both of the application processor 116 or the auxiliary processor 117 can be a microprocessor, a group of processing components, one or more Application Specific Integrated Circuits (ASICs), programmable logic, or other type of processing device. The application processor 116 and the auxiliary processor 117 can be operable with the various components of the electronic device 101. Each of the application processor 116 and the auxiliary processor 117 can be configured to process and execute executable software code to perform the various functions of the electronic device 101. A storage device, such as memory 118 or on-board memory 119, can optionally store the executable software code used by the application processor 116 or the auxiliary processor 117 during operation.

In this illustrative embodiment, the electronic device 101 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, and other networks. The communication circuit 125 can include wireless communication circuitry, one of a receiver, a transmitter, or transceiver, and one or more antennas 126.

The fingerprint sensor 110 is operable with one or both of the application processor 116 or the auxiliary processor 117 in one or more embodiments. In one embodiment, the fingerprint sensor 110 can include an array of pixels. The fingerprint sensor 110 can be a complementary metal-oxide-semiconductor active pixel sensor digital imager or any other fingerprint sensor. The fingerprint sensor 110 can be configured to capture a live scan of a fingerprint pattern from a finger disposed along its surface. The fingerprint sensor 110 may also be able to capture one or more images. The images can correspond to an area beneath a surface of skin. The fingerprint sensor 110 can compare the fingerprint data or skin images to one or more references to authenticate a user in an authentication process.

In one embodiment, the application processor 116 can be responsible for performing the primary functions of the electronic device 101. For example, in one embodiment the application processor 116 comprises one or more circuits operable to present presentation information, such as images, text, and video, on the display 102. The executable software code used by the application processor 116 can be configured as one or more modules 120 that are operable with the application processor 116. Such modules 120 can store instructions, control algorithms, and so forth.

In one embodiment, the application processor 116 is responsible for running the operating system environment 121. The operating system environment 121 can include a kernel, one or more drivers 122, and an application service layer 123, and an application layer 124. The operating system environment 121 can be configured as executable code operating on one or more processors or control circuits of the electronic device 101.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 101, an electronic mail application 105 configured to send and receive electronic mail, a photo application 106 configured to permit the user to view images or video on the display 102 of electronic device 101, and a camera application 107 configured to capture still (and optionally video) images. These applications are illustrative only, as others will be obvious to one of ordinary skill in the art having the benefit of this disclosure.

In one or more embodiments, the application processor 116 is responsible for managing the applications and all secure information of the electronic device 101. Secure information can include personal information that is revealed only to authorized users upon authentication by the fingerprint sensor 110. The application processor 116 is also responsible for launching, monitoring and killing the various applications and the various application service modules. The applications of the application layer 124 can be configured as clients of the application service layer 123 to communicate with services through application program interfaces (APIs), messages, events, or other inter-process communication interfaces.

In one or more embodiments, the auxiliary processor 117 is tasked with executing non-secure or non-application operations. For example, the auxiliary processor 117 may execute input/output functions, actuate user feedback devices, and so forth. In one embodiment the auxiliary processor 117 is not permitted execute any operations involving personal information that is revealed only to authorized users upon authentication by the fingerprint sensor 110.

In one or more embodiments, as it tasked with many more operations to manage, the application processor 116 consumes more power than does the auxiliary processor 117 on an average basis when operating normally under an average load. For example, in ordinary operation the application processor 116 may consume on the order of tens of Watts or more when running applications or communicating voice or other data, while the auxiliary processor may only consume on the order of less than a Watt in its normal operation. Accordingly, in one or more embodiments the auxiliary processor 117 will consume less power than the application processor 116 when both the auxiliary processor 117 and the application processor 116 are operational. In some situations, the application processor 116 can consume an order or magnitude or more power than the auxiliary processor 117. Advantageously, one or more embodiments of the disclosure deliver a state output 108 to cause activation of one or more functions of the auxiliary processor 117 upon fingerprint authentication while leaving the application processor 116 in the low power or sleep mode. This solution works to conserve overall power usage in the electronic device 101 by utilizing the auxiliary processor 117 to provide device functionality while leaving the application processor 116 in a low power state.

This difference in power consumption can result in different operational characteristics for each processor. For example, in one or more embodiments the application processor 116 can be placed into a low power or sleep mode when the electronic device 101 is not in use. When the application processor 116 is in the low power or sleep mode, the display 102 may be OFF and the various applications will not be operational.

By contrast, in one or more embodiments the auxiliary processor 117 may be left in a continually operational mode. Said differently, in one or more embodiments the auxiliary processor 117 is to operate in an operational mode while the application processor 116 is in the low power or sleep mode. As the auxiliary processor 1176 consumes relatively low power, this may provide advantages such as quicker response times when a user begins, for example, interacting with the fingerprint sensor 110 or other components of the electronic device 101.

In one embodiment, the auxiliary processor 117 is configured to detect, with the fingerprint sensor 110 or another sensor, when the electronic device 101 is in a user's hand. This information can be used to define operational modes of the auxiliary processor 117. For example, when the electronic device 101 is not in the user's hand, e.g., when the electronic device 101 is in a pocket, the auxiliary processor 117 may be configured to not provide visual and/or audible feedback. Alternatively, when the electronic device 101 is not in the user's hand the auxiliary processor 117 may be configured to authentication failures form the fingerprint sensor 110. Other "non-in-hand" features will be obvious to those of ordinary skill in the art having the benefit of this disclosure.

In one embodiment, the application processor 116 operable to arm the fingerprint sensor 110 prior to the application processor 116 entering the low power or sleep mode. For example, when the electronic device 101 is unlocked and operational, there may be little or no need for biometric authentication via the fingerprint sensor 110. Accordingly, the application processor 116 may disarm the fingerprint sensor 110. Where the fingerprint sensor 110 is a dual or multifunction device, secondary or other functionality may remain operational when the fingerprint sensor 110 is disarmed. For instance, a user may still be able to press the push button of the dual action fingerprint sensor to take a photograph. However, in many instances when the application processor 116 enters the low power or sleep mode, it may lock the electronic device 101 so that it is not accessible. Accordingly, in one or more embodiments the application processor 116 arms and/or activates the fingerprint sensor 110 prior to entering the low power or sleep mode.

While the fingerprint sensor 110 is armed and the application processor 116 is in the low power or sleep mode, the auxiliary processor 117 is to receive a state output 108 from the fingerprint sensor 110. As will be described in more detail with reference to FIG. 3, in one embodiment the state output 108 can be one of four states: an authenticating state, which is a first state that indicates an authentication process of a fingerprint is in progress, an authenticated state, which is a second state that indicates successful authentication of the fingerprint, an unauthenticated, which is a third state occurring when the fingerprint sensor is waiting to begin the authentication process, and an error state, which is a fourth state indicative of an error occurring in the authentication process occurring in the fingerprint sensor 110.

In one or more embodiments, the fingerprint sensor 110 to change the state output 108 to indicate a successful completion of a fingerprint authentication process to the auxiliary processor 117 while retaining data used during the fingerprint authentication process within the fingerprint sensor 110. In one embodiment, this indication of the successful completion of the fingerprint authentication process by way of the changing or the state output 116 in the low power or sleep mode. In one embodiment, the state output 108 is to cause activation of one or more functions of the auxiliary processor 117 upon fingerprint authentication. For example, the auxiliary processor 117 may actuate one of a visible output, a haptic output, an audio output, or combinations thereof in response to the state output 108 changing.

In one or more embodiments, the one or more functions of the auxiliary processor 117 are activated in response to the state output 108 while leaving the application processor 116 in the low power or sleep mode. Advantageously, the electronic device 101 can perform non-secure or non-application functions without waking the application processor 116 each and every time the user interfaces the fingerprint sensor 110, thereby conserving power and extending battery run time. At the same time, the use of the state output 108 ensures that the fingerprint or other biometric data is protected within the fingerprint sensor 110 rather than being transmitted to other circuit components.

Figures 2, 3:
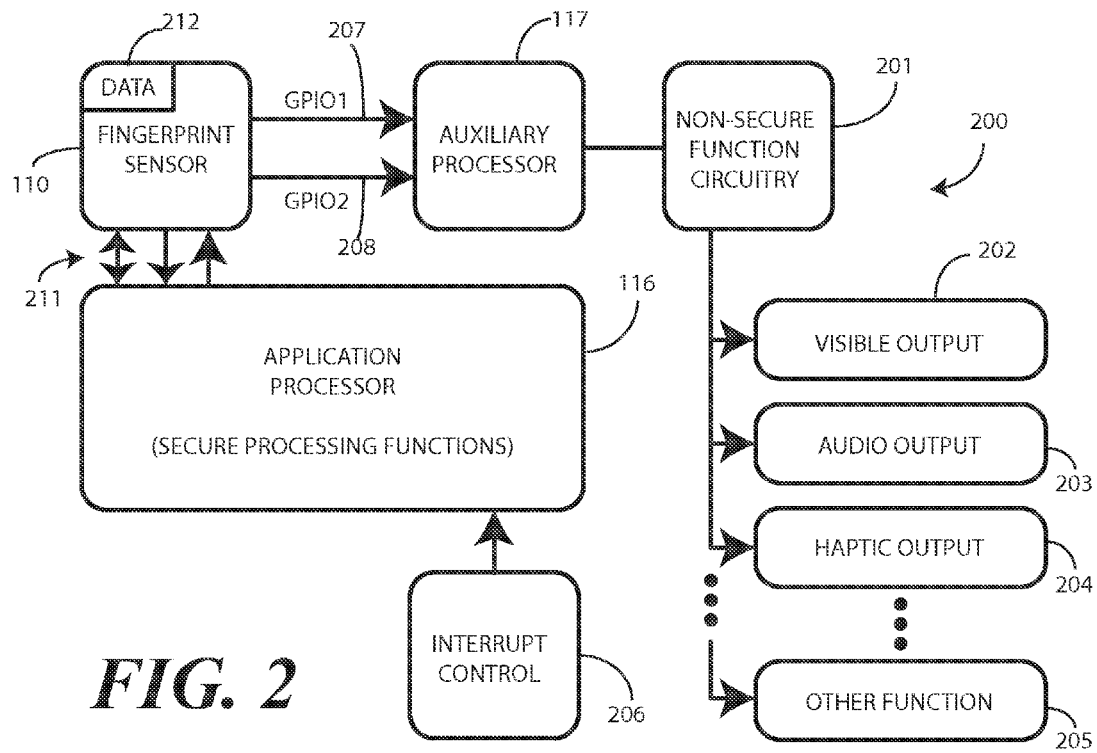
FIG. 2 illustrates one explanatory schematic block diagram associated with one or more embodiments of the disclosure.
FIG. 3 illustrates one explanatory state diagram associated with one or more embodiments of the disclosure.

Turning now to FIG. 2, illustrated therein is a schematic block diagram of the front end 200 of the system (100) of FIG. 1. The front end includes the fingerprint sensor 110, the application processor 116, and the auxiliary processor 117. The auxiliary processor 117 may optionally be operable with non-secure function circuitry 201 to control one or more functions, including actuation of a visible output 202, actuation of an audio output 203, actuation of a haptic or tactile output 204 that a user can feel, or actuation of another function 205. Alternatively, the auxiliary processor 117 may actuate or control the one or more functions directly in other embodiments.

An interrupt control 206 is also operable with the application processor 116. The interrupt control 206 can be triggered in one of a variety of ways. For example, where the fingerprint sensor 110 is capable of performing multiple functions, the interrupt control 206 may be responsive to touching and pressing of the fingerprint sensor 110. Alternatively, where the fingerprint sensor 110 is instead a single function device, the interrupt control 206 may be responsive to another user control, such as push button (109) from FIG. 1. Other modes of actuating the interrupt control 206 will be obvious to those of ordinary skill in the art having the benefit of this disclosure.

When the interrupt control 206 is actuated, in one embodiment the application processor 116 exits the low power or sleep mode. When this happens, several additional actions can occur. In one embodiment, the application processor 116 is permits any authentication process occurring in the fingerprint sensor 110 to complete. In another embodiment, the application processor 116 is to interrupt the authentication process occurring in the fingerprint sensor 110 upon exiting the low power or sleep mode. In yet another embodiment, the application processor 116 can reset the authentication process of the fingerprint sensor 110 after exiting the low power or sleep mode. In yet another embodiment, the application processor 116 can request an authentication state from the fingerprint sensor 110 upon exiting the low power or sleep mode in response to the actuation of the interrupt control. Other actions will be obvious to those of ordinary skill in the art having the benefit of this disclosure.

In one embodiment, both the fingerprint sensor 110 and the auxiliary processor 117 are to operate in a mode that is autonomous of the application processor 116 at substantial, or all, times. This provides a real-time, "always ON" responsiveness of the fingerprint sensor and functions that the auxiliary processor 117 can actuate for the user while allowing the application processor 116 to enter a low power or sleep mode.

State information is provided from the fingerprint sensor 110 to the auxiliary processor in the form of a state output 108 that is defined by two general purpose input output state lines, namely a first general purpose input output state line 207 and a second general purpose input output state line 208. The fingerprint sensor 110 provides general purpose input output information via the first general purpose input output state line 207 and the second general purpose input output state line 208 to a general purpose input output connection 209 at the auxiliary processor 117. The state output 108 can change in accordance with one of many methods, one of which will be described in more detail with reference to FIG. 4.

In the illustrative embodiment of FIG. 2, two general purpose input output state lines 207,208 are used with a state diagram (described below with reference to FIG. 3). It should be noted that these two general purpose input output state lines 207,208 are used to illustrate one explanatory communication path between the fingerprint sensor 110 and the auxiliary processor 117. Moreover, the states of the state diagram discussed below with reference to FIG. 3 illustrate explanatory states that are useful in practice. For designers desiring more security, other communication interfaces may be substituted for the two general purpose input output state lines 207,208. Illustrating by example, a designer may substitute a one-wire bus, two-wire bus, or other communication interface so that a secure, encrypted channel is established between the fingerprint sensor 110 and the auxiliary processor 117. Other communication interfaces will be obvious to those of ordinary skill in the art having the benefit of this disclosure.

Turning briefly to FIG. 3, illustrated therein are explanatory states for the first general purpose input output state line 207 and the second general purpose input output state line 208 that are suitable for use with the front end (200) of FIG. 2. In the illustrative embodiment of FIG. 3, there are four states. A first state 301 is the "unauthenticated" state. The first state 301 occurs when the fingerprint sensor (110) is waiting for a finger touch to begin the authentication process. A second state 302 is the "authenticating" state. This second state 302 occurs when a finger or other object has been detected proximately located with a surface of the fingerprint sensor (110) and the fingerprint sensor (110) is in the process of performing the authentication process on the data received by the fingerprint sensor (110). In one or more embodiments, prior to transitioning from the first state 301 to the second state, the fingerprint sensor (110) may determine—with a reasonable amount of certainty—that the object touching or otherwise proximately located with the fingerprint sensor (110) is actually a finger and not an object in capable of authentication.

A third state 303 is the "authenticated" state. The third state 303 occurs when the finger currently in contact with the sensor has been successfully authenticated, thereby indicating that the user attached to the finger is authorized to access the electronic device (101). A fourth state 304 is the "error" state. The fourth state 304 occurs when the fingerprint sensor (110), for whatever reason, enters an error state and needs to be reset, recalibrated, or otherwise addressed, e.g., have a validity service module communicate with the executable code operating in the fingerprint sensor (110). While the fourth state 304 is expected to rarely, and preferably never, happen, it can occur. Accordingly the fourth state 304 is provided. One reason the fourth state 304 can occur, for example, is when the fingerprint sensor (110) is in need of calibration to properly authenticate a fingerprint. Accordingly, in one or more embodiments the fourth state 304 can serve as a request for the application processor (116) or auxiliary processor (117) to perform a recalibration process.

Turning now back to FIG. 2, in one or more embodiments, upon receiving predetermined state information, such as the information provided in the third state (303) of FIG. 3, the auxiliary processor 117 can provide an early wake signal 210 to the non-secure function circuitry 201 to actuate any of the visible output 202, audio output 203, haptic or tactile output 204, or another function 205 while leaving the application processor 116 in the low power or sleep mode. In one or more embodiments, the fingerprint sensor 110 and application processor 116 may also have unilateral and/or bilateral connections 211 for exchanging information, such as SPI, DRDY, and SLEEP.

In one or more embodiments, the fingerprint sensor 110 may operate in the following way or ways: When the application processor 116 arms the fingerprint sensor 110, the fingerprint sensor 110 may operate autonomously with minimal or no required input from the application processor 116, except in the case of an error. The internal state of the fingerprint sensor 110 may be output on the first general purpose input output state line 207 and the second general purpose input output state line 208 to the general purpose input output connection 209 at the auxiliary processor 117. In one embodiment, the internal state of the fingerprint sensor is output on the first general purpose input output state line 207 and the second general purpose input output state line 208 in accordance with the states shown in FIG. 3. If the application processor 116 exits the low power or sleep mode while the fingerprint sensor 110 is in one of these states, the application processor 116 poll the fingerprint sensor 110 to get its current state at any time, disarm the fingerprint sensor 110, thereby breaking the authentication process cycle at any time, or perform one of the other functions previously described.

Figure 4:
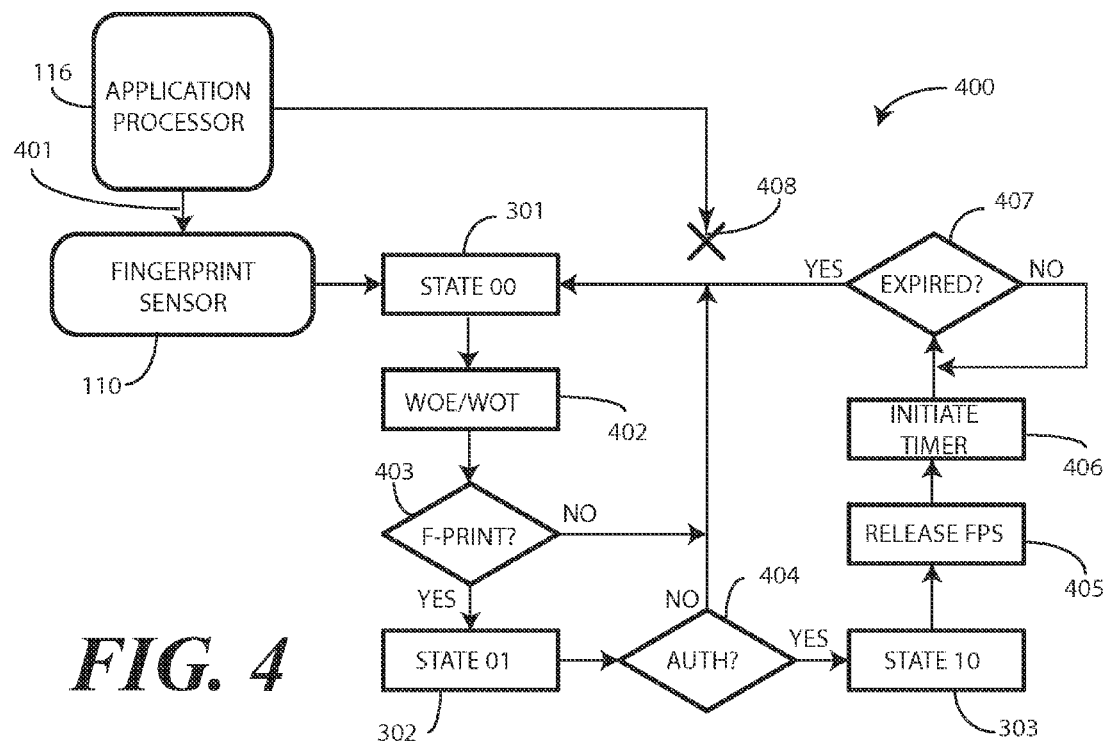
FIG. 4 illustrates one explanatory method associated with one or more embodiments of the disclosure.
Figure 5:
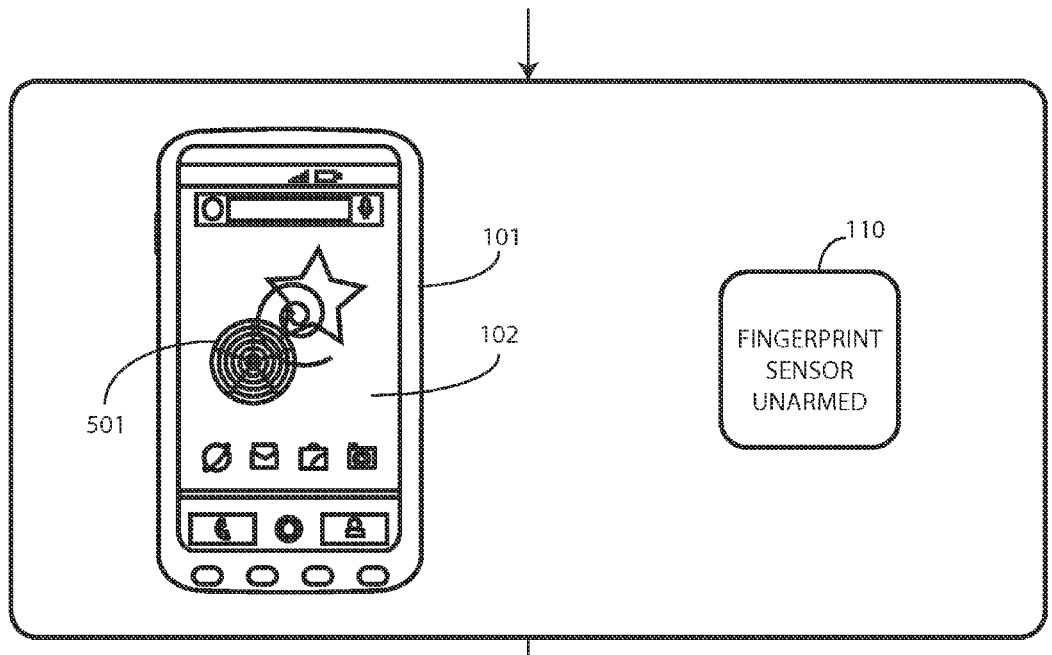
FIG. 5 illustrates one explanatory method step in accordance with one or more embodiments of the disclosure.

As noted above, in one embodiment the auxiliary processor 117 receives the state output 108 from the fingerprint sensor 110 and the state output 108 causes activation of one or more functions of the auxiliary processor 117 upon fingerprint authentication while leaving the application processor 116 in the low-power or sleep mode. In one embodiment, the fingerprint sensor 110 is to change the state output 108 to indicate a successful completion of a fingerprint authentication process to the auxiliary processor 117 while retaining data 212 used during the fingerprint authentication process within the fingerprint sensor. Turning now to FIG. 4, illustrated therein is one explanatory state diagram 400 by which this can occur.

The application processor 116 initially arms 401 the fingerprint sensor 110. In one embodiment, the application processor 116 arms 401 the fingerprint sensor 110 upon entering a low power or sleep mode. This allows the fingerprint sensor 110 to operate in an operational mode while the application processor 116 is in the low-power or sleep mode. When armed, the fingerprint sensor 110 can output a first state 301 to the auxiliary processor (117) indicating the fingerprint sensor 110 is waiting for a finger touch to begin the authentication process.

At step 402, the fingerprint sensor 110 is to wake on an event or wake on touch. In one embodiment, the fingerprint sensor 110 is to enter an input reception mode upon an object contacting a surface of the fingerprint sensor at this step 402.

At decision 403, the fingerprint sensor 110 can be to determine whether an object touching the fingerprint sensor 110 is a finger or some other object in one or more embodiments. Where the object is a finger, the fingerprint sensor 110 receives fingerprint data. Decision 403 is useful to increase power savings. Determining whether an object is a finger prior to changing the state output (108) works to minimize changes on the state output lines and therefore only interrupts the auxiliary processor (117) when an actual finer is present.

The fingerprint sensor 110 then begins the authentication process. While doing so, the fingerprint sensor 110 can output a second state 302 to the auxiliary processor (117) indicating an authentication process of a fingerprint is in progress. It should be noted that the application processor 116 can exit the low power or sleep mode to interrupt 408 the authentication process at any time.

At decision 404, the fingerprint sensor 110 determines whether successful authentication of the fingerprint has occurred. Where it has, the fingerprint sensor can output a third state 303 to the auxiliary processor (117) indicating the successful authentication of the fingerprint. In one or more embodiments, output of the third state 303 causes activation of one or more functions of the auxiliary processor (117) upon fingerprint authentication. Examples of these functions include activation of an audible feedback device, a haptic feedback device, a visible feedback device, or combinations thereof.

Where the fingerprint sensor 110 determines that authentication was unsuccessful, in one embodiment, upon returning to state 301, a counter can be set. The counter can count the number of unsuccessful authentication attempts. In one embodiment, once the number of unsuccessful authentication attempts has occurred, the auxiliary processor (117) can perform a predetermined action. One example of the predetermined action would be to ignore future state changes. Another example of a predetermined action would be to wake the application processor 116. Another example of a predetermined action would be to disable the fingerprint sensor. Other predetermined actions will be obvious to those of ordinary skill in the art having the benefit of this disclosure.

In one or more embodiments, the fingerprint sensor 110 can the move into a low power state and await finger liftoff from the fingerprint sensor 110 at step 405. The reason for this step 405 is that, in one embodiment, the fingerprint sensor 110 will continue to remain in an authenticated state so long as the finger remains in contact with the fingerprint sensor 110.

The fingerprint sensor can initiate a timer at step 406 when the state output transitions to the third state 303. Inclusion of the timer is optional. The timer can be optionally included to allow programmable flexibility in how quickly the fingerprint sensor transition from the third state 303 to the first state 301. To illustrate by example, in one embodiment the fingerprint sensor 110 is a dual function device in that it and the interrupt control (206) are co-located. An electronic device (101) can be in an inactive mode with the display (102) turned OFF. If the fingerprint sensor 110 is in the third state 303, and a user places their finger again on the sensor to press the push button (109) to actuate the interrupt control (206), without the timer the state diagram 400 would need to begin anew. To ensure that the application processor 116 has sufficient time to exit the low power or sleep mode as a result of the interrupt control (206)

being actuated, as well as optionally request the authentication state from the fingerprint sensor 110, the timer may be set to half a second or so.

Where the timer is included, the fingerprint sensor 110 determines whether the timer has expired at decision 407. The fingerprint sensor 110 can then output the first state 301 to the auxiliary processor indicating the fingerprint sensor 110 upon expiration of the timer.

During normal operation, the state diagram runs as previously described. However, embodiments of the disclosure contemplate that there can be instances in which the fingerprint sensor 110 enters an error state. This can be due to the inability to authenticate fingerprint data, misread executable code, processor issues, or other troubles. When this occurs, an application support mechanism supported by the application processor 116 is required to reset or otherwise address the error state. Thus, in one embodiment, the fingerprint sensor 110 is to output a fourth state 304 to the auxiliary processor (117) indicative of an error occurring in the authentication process whenever an error occurs. When the third state 303 is output by the fingerprint sensor, the third state 303 causes the auxiliary processor (117) to cause the application processor 116 to exit the low power or sleep mode. The application processor 116 can then reset or otherwise address and/or correct the authentication process of the fingerprint sensor 110 after exiting the low power or sleep mode.

In accordance with the state diagram 400 of FIG. 4, the fingerprint sensor 110 can enter an armed mode, detect an object contacting a surface of the fingerprint sensor 110 while the application processor 116 is in a low-power or sleep mode, and transition a state output (108) to the auxiliary processor (117) from a first state 301 to a second state 302 after the detecting. The fingerprint sensor 110 can then authenticate the object and can, upon authenticating the object, transition the state output from the second state 302 to a third state 303 to cause the auxiliary processor (117) to perform one or more functions while leaving the application processor 116 in the low-power or sleep mode. In one or more embodiments, the fingerprint sensor 110 can transition the state output (108) from the second state 302 to the third state 303 while leaving the application processor in the low-power or sleep mode. In one embodiment, the fingerprint sensor 110 can initiate a timer, and can transition the state output (108) from the third state 303 to the fourth state 304 occurring after expiration of the timer.

Turning now to FIGS. 5-12, illustrated therein are some method steps illustrating use cases for embodiments of the disclosure. Beginning with FIG. 5, the electronic device 101 is in its operational mode. The application processor (116) is executing an application in an operating system environment and the application output 501 is being presented on the display 102. In one embodiment, this results in the fingerprint sensor 110 being unarmed.

Figure 6:
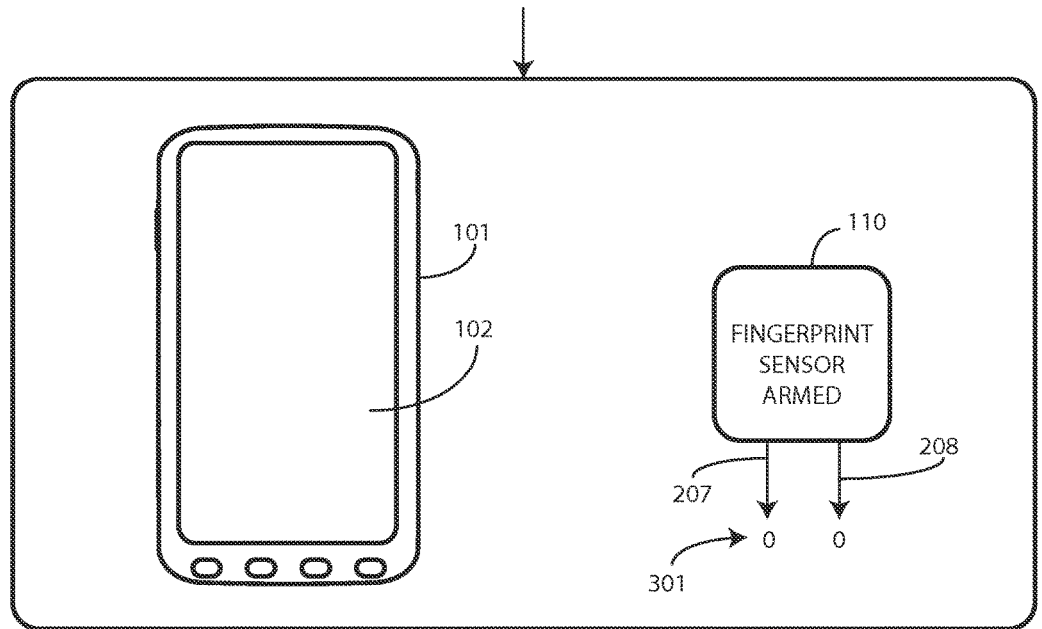
FIG. 6 illustrates one explanatory method step in accordance with one or more embodiments of the disclosure.

Turning now to FIG. 6, the electronic device 101 has entered an inactive mode. The display 102 is blank as the application processor (116) has entered a low power or sleep mode. Prior to doing so, however, the application processor (116) has armed the fingerprint sensor 110. Accordingly, the fingerprint sensor 110 sets the first general purpose input output state line 207 and the second general purpose input output state line 208 to 0 and 0, respectively, so as to indicate the first state 301 to the auxiliary processor (117). Internally, the fingerprint sensor 110 sets its state to unauthenticated. The fingerprint sensor 110 can enter a low power state waiting for a touch of something to trigger the fingerprint sensor 110.

Figure 7:
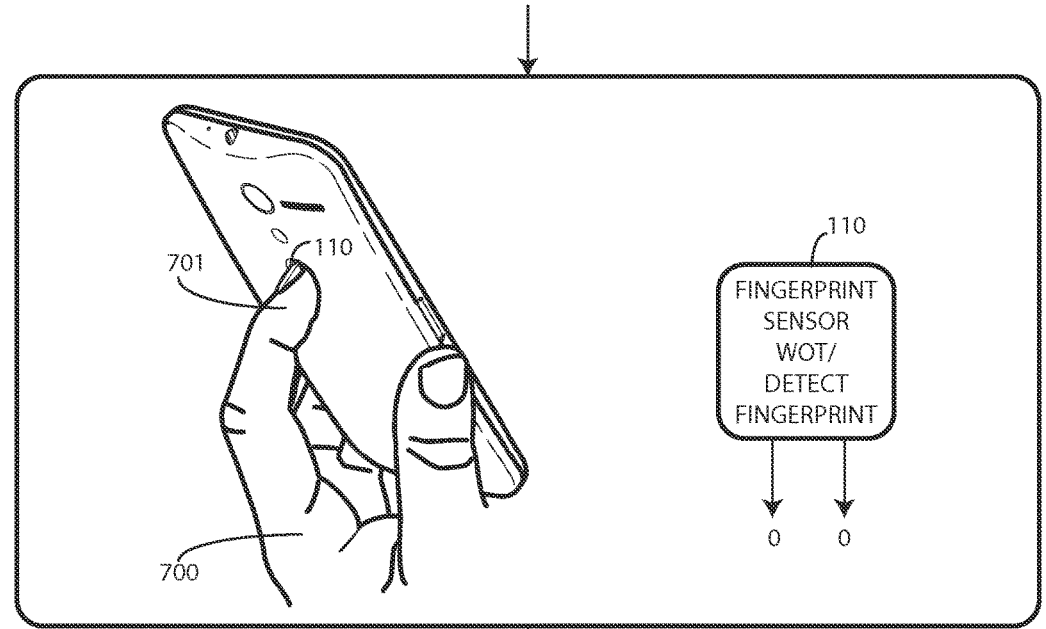
FIG. 7 illustrates one explanatory method step in accordance with one or more embodiments of the disclosure.
Figure 8:
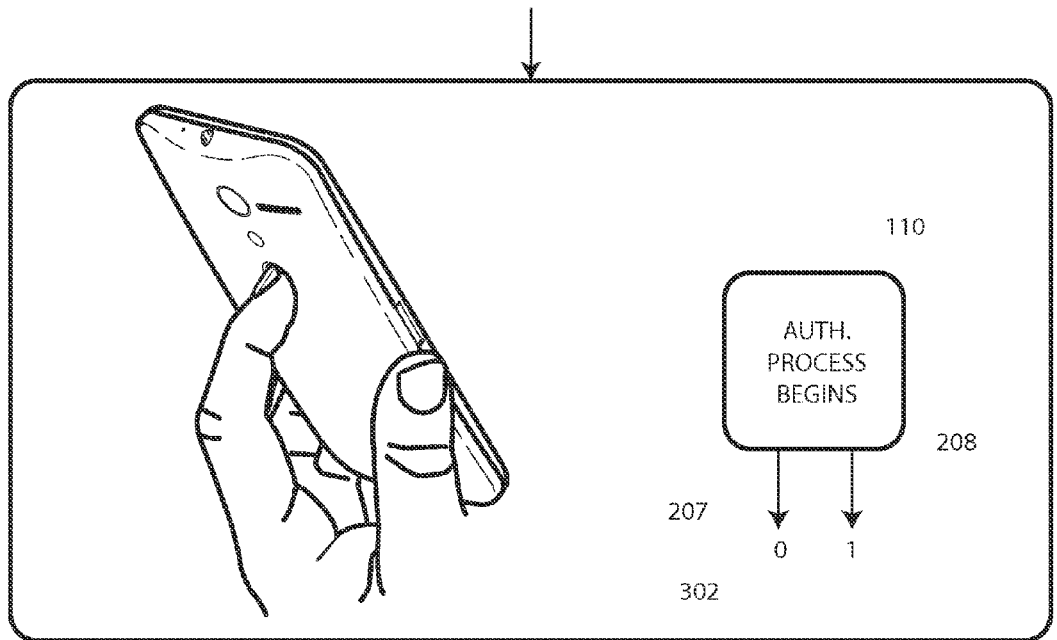
FIG. 8 illustrates one explanatory method step in accordance with one or more embodiments of the disclosure.

Turning now to FIG. 7, a user 700 places a finger 801 on the fingerprint sensor 110. In one embodiment, the fingerprint sensor 110 first confirms the finger 801 is actually a finger. Turning to FIG. 8, where this is the case, the authentication process begins in the fingerprint sensor 110. Accordingly, the fingerprint sensor 110 sets the first general purpose input output state line 207 and the second general purpose input output state line 208 to 0 and 1, respectively, so as to indicate the second state 302 to the auxiliary processor (117). Internally, the fingerprint sensor 110 sets its state to authenticating.

Figure 9:
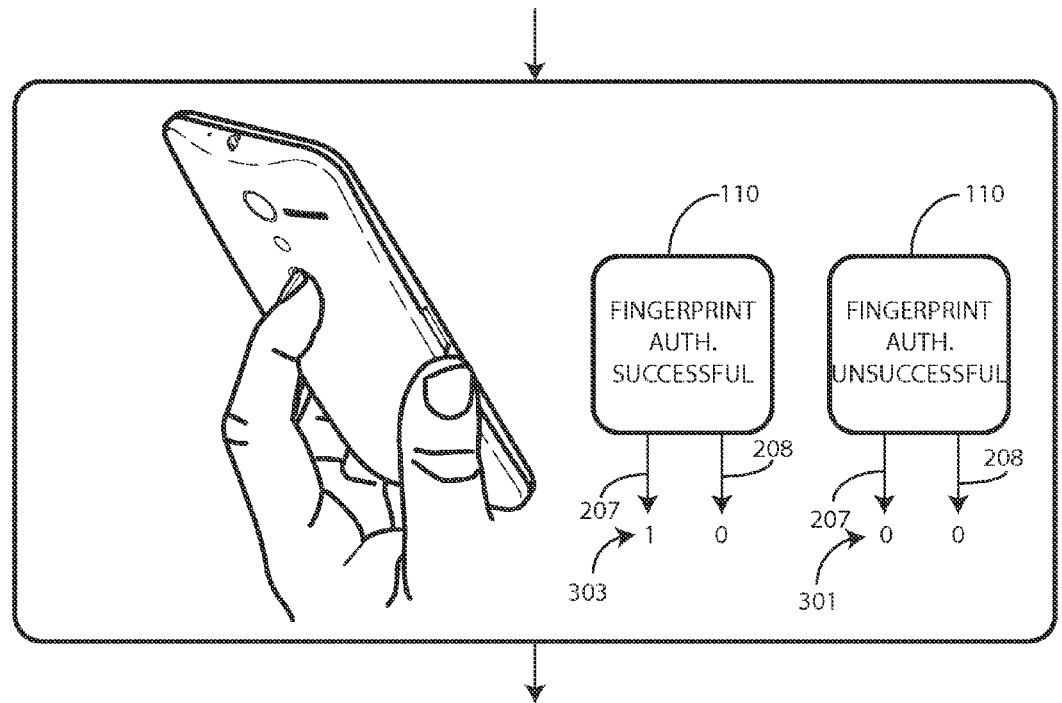
FIG. 9 illustrates one explanatory method step in accordance with one or more embodiments of the disclosure.

Turning now to FIG. 9, one of two options can occur: First, authentication can be successful. Where this is the case, the fingerprint sensor 110 sets the first general purpose input output state line 207 and the second general purpose input output state line 208 to 1 and 0, respectively, so as to indicate the third state 303 to the auxiliary processor (117). Internally, the fingerprint sensor 110 sets its state to authenticated. Alternatively, authentication can be unsuccessful. Where this is the case, the fingerprint sensor 110 sets the first general purpose input output state line 207 and the second general purpose input output state line 208 to 0 and 0, respectively, so as to indicate the first state 301 to the auxiliary processor (117). Internally, the fingerprint sensor 110 sets its state to unauthenticated.

Figure 10:
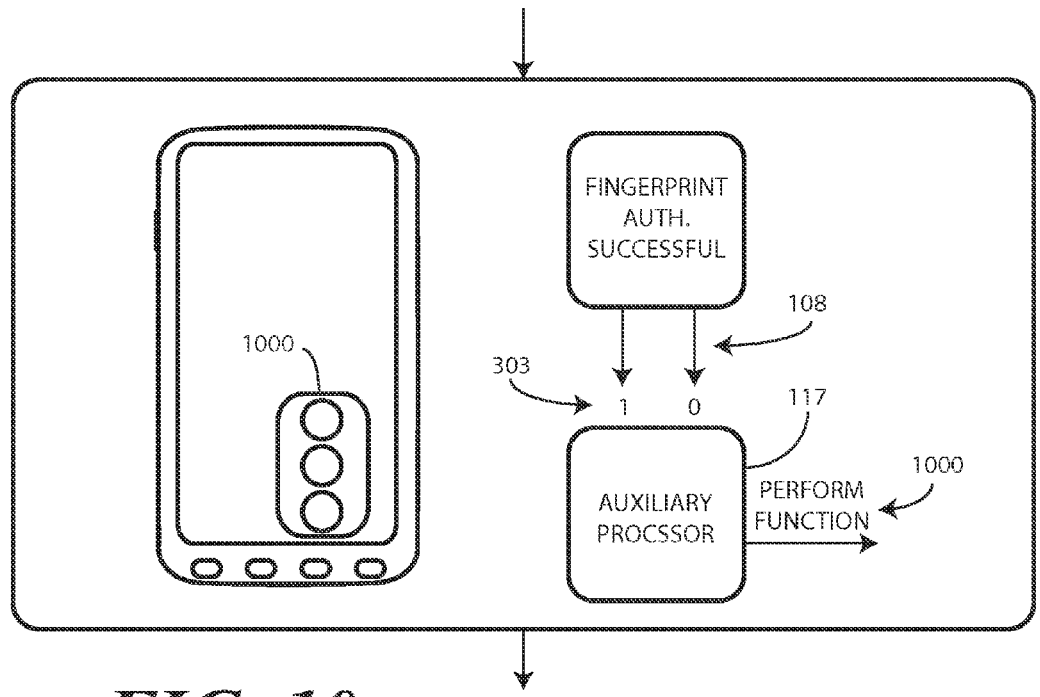
FIG. 10 illustrates one explanatory method step in accordance with one or more embodiments of the disclosure.

Turning to FIG. 10, the transitioning of the state output 108 from the second state (302) to the third state 303 after the authenticating causes the auxiliary processor 117 to perform one or more functions 1000. In one embodiment, this occurs while leaving the application processor (116) in the low power or sleep mode.

Figure 11:
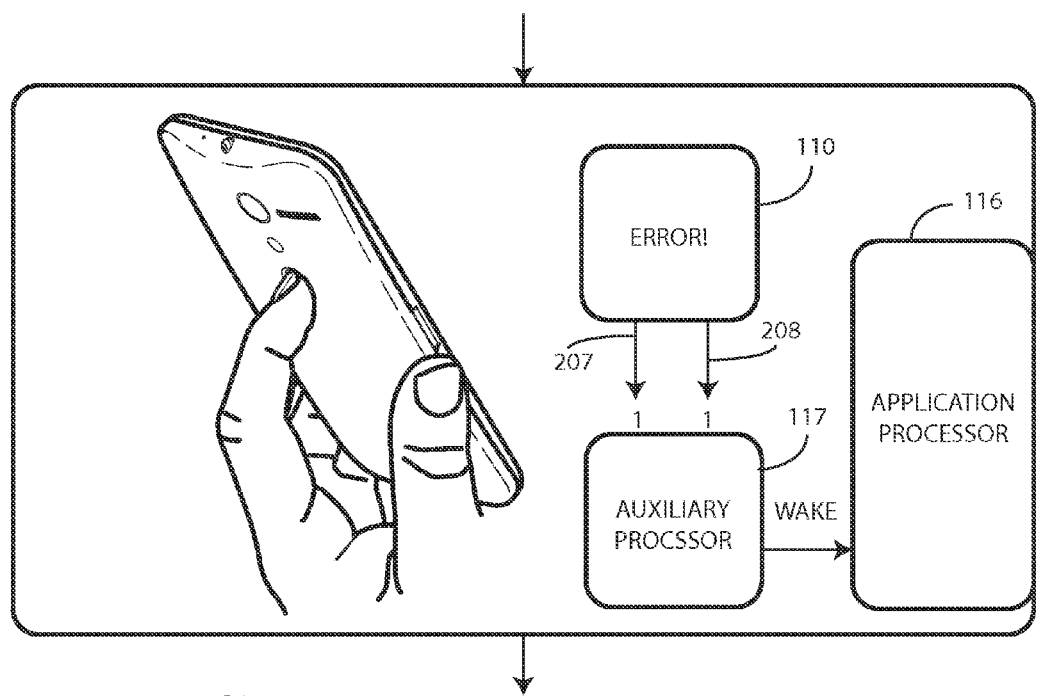
FIG. 11 illustrates one explanatory method step in accordance with one or more embodiments of the disclosure.

Turning to FIG. 11, for whatever reason, the fingerprint sensor 110 has entered an error mode. Accordingly, the fingerprint sensor 110 sets the first general purpose input output state line 207 and the second general purpose input output state line 208 to 1 and 1, respectively, so as to indicate the fourth state 304 to the auxiliary processor 117. Internally, the fingerprint sensor 110 sets its state to error mode. This causes the auxiliary processor 117 to wake the application processor 116 from the low power or sleep mode so that the error mode of the fingerprint sensor 110 can be addressed.

Figure 12:
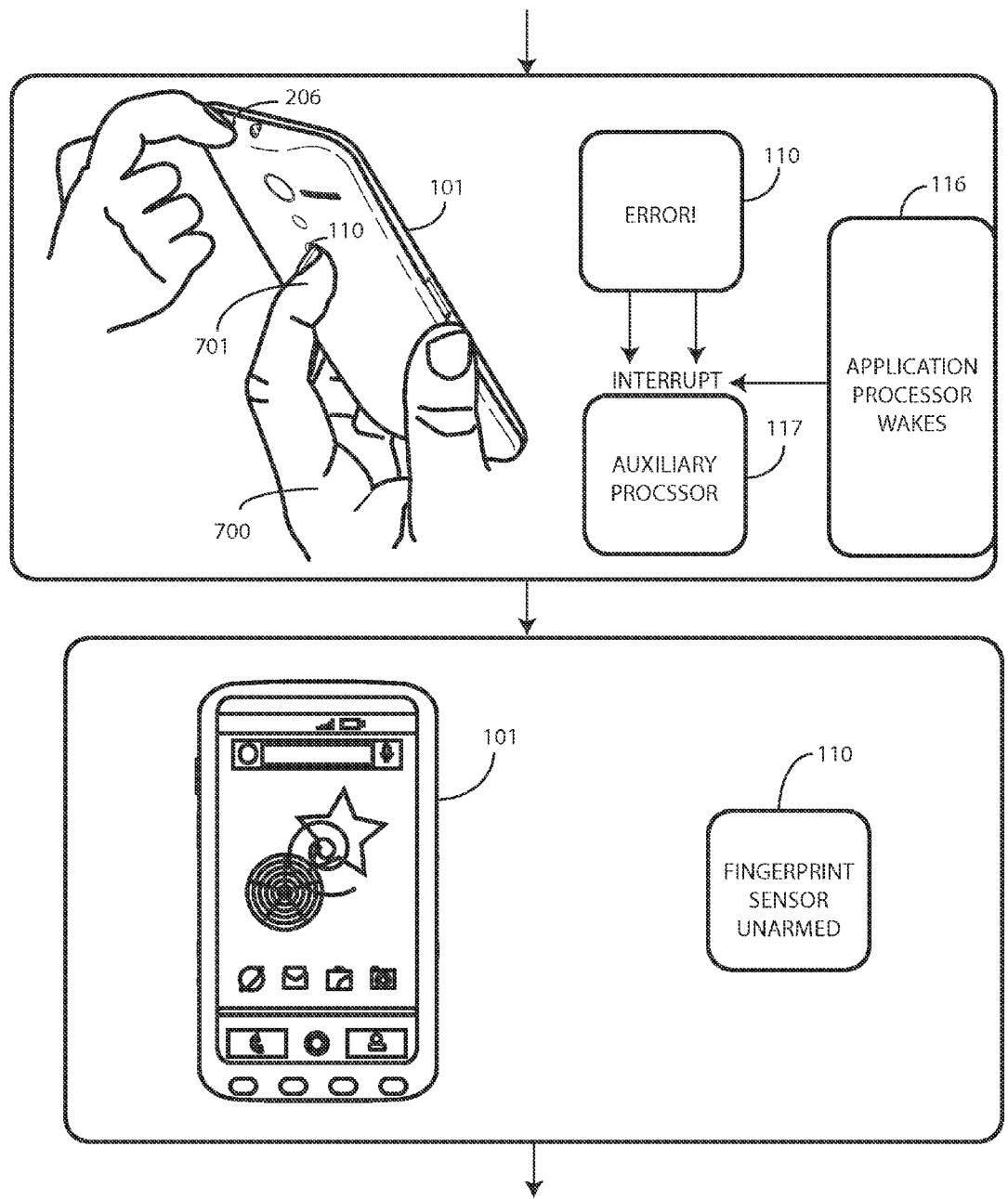
FIG. 12 illustrates explanatory method steps in accordance with one or more embodiments of the disclosure.

Turning to FIG. 12, the user 700 is touching the fingerprint sensor 110. Accordingly, in one embodiment the state diagram (400) is running. However, the user 700 also touches the interrupt control 206. This causes the application processor 116 to exit the low power or sleep mode and, in this embodiment, to interrupt the state diagram (400). The electronic device 101 then becomes operational (presuming prior authentication of the user's finger 701 in one embodiment) and the fingerprint sensor 110 is disarmed.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A system, comprising:
a fingerprint sensor;
an application processor connected to the fingerprint sensor via a connection and configured to arm the fingerprint sensor prior to the application processor entering a low power or sleep mode, and to interrupt an authentication process in response to exiting the low power or sleep mode, the connection configured to convey a status of at least one of a serial peripheral interface transfer mode, a device ready mode, or a sleep mode;
an auxiliary processor connected to the fingerprint sensor via two state lines and configured to receive a state output from the fingerprint sensor, one or more functions of the auxiliary processor configured to be activated, in response to the state output, related to fingerprint authentication while the application processor remains in the low power or sleep mode, the state output comprising a first state indicating the authentication process of a fingerprint is in progress, a second state indicating successful authentication of the fingerprint, and a third state indicating that the fingerprint sensor is waiting to begin the authentication process, the fingerprint sensor configured to initiate a timer in response to the state output transitioning to the second state, the state output configured to transition from the second state to the third state in response to a passing of a duration of time measured by the timer; and
an interrupt control configured to cause the application processor to exit the low power or sleep mode in response to an actuation of the interrupt control, the interrupt control separate from the application processor, the interrupt control separate from the auxiliary processor.

2. The system of claim 1, the auxiliary processor configured to operate in an operational mode while the application processor is in the low power or sleep mode.

3. The system of claim 1, the state output comprising a fourth state indicative of an error occurring in the authentication process.

4. The system of claim 3, the auxiliary processor configured to cause, in response to the state output being in the fourth state, the application processor to exit the low power or sleep mode.

5. The system of claim 1, the fingerprint sensor configured to enter an input reception mode in response to an object contacting a surface of the fingerprint sensor.

6. The system of claim 1, the auxiliary processor configured to consume less power than the application processor when both the auxiliary processor and the application processor are operational.

7. The system of claim 1, the one or more functions comprising activation of an audible feedback device, a haptic feedback device, a visible feedback device, or combinations thereof.

8. A system, comprising:
a fingerprint sensor;
an application processor connected to the fingerprint sensor via a connection and configured to arm the fingerprint sensor prior to the application processor entering a low power or sleep mode, and to reset an authentication process of the fingerprint sensor after exiting the low power or sleep mode, the connection configured to convey a status of at least one of a serial peripheral interface transfer mode, a device ready mode, or a sleep mode;
an auxiliary processor connected to the fingerprint sensor via two state lines and configured to receive a state output from the fingerprint sensor, one or more functions of the auxiliary processor configured to be activated, in response to the state output, related to fingerprint authentication while the application processor remains in the low power or sleep mode, the state output comprising a first state indicating the authentication process of a fingerprint is in progress, a second state indicating successful authentication of the fingerprint, and a third state indicating that the fingerprint sensor is waiting to begin the authentication process, the fingerprint sensor configured to initiate a timer in response to the state output transitioning to the second state, the state output configured to transition from the second state to the third state in response to a passing of a duration of time measured by the timer; and
an interrupt control configured to cause the application processor to exit the low power or sleep mode in response to an actuation of the interrupt control, the interrupt control separate from the application processor, the interrupt control separate from the auxiliary processor.

9. A system, comprising:
a fingerprint sensor;
an application processor connected to the fingerprint sensor via a connection and configured to arm the fingerprint sensor prior to the application processor entering a low power or sleep mode, the connection configured to convey a status of at least one of a serial peripheral interface transfer mode, a device ready mode, or a sleep mode;
an auxiliary processor an auxiliary processor connected to the fingerprint sensor via two state lines and configured to receive a state output from the fingerprint sensor, one or more functions of the auxiliary processor configured to be activated, in response to the state output, related to fingerprint authentication while the application processor remains in the low power or sleep mode, the state output comprising a first state indicating an authentication process of a fingerprint is in progress, a second state indicating successful authentication of the fingerprint, and a third state indicating that the fingerprint sensor is waiting to begin the authentication process, the fingerprint sensor configured to initiate a timer in response to the state output transitioning to the second state, the state output configured to transition from the second state to the third state in response to a passing of a duration of time measured by the timer; and
an interrupt control configured to cause the application processor to exit the low power or sleep mode in response to an actuation of the interrupt control, wherein the application processor is further configured to request an authentication state from the fingerprint sensor in response to exiting the low power or sleep mode in response to the actuation of the interrupt control, the interrupt control separate from the application processor, the interrupt control separate from the auxiliary processor.

10. A method, comprising:
in a fingerprint sensor operable with an application processor, an auxiliary processor, and an interrupt control:

entering an armed mode via a signal from the application processor, the application processor connected to the fingerprint sensor via a connection, the connection configured to convey a status of at least one of a serial peripheral interface transfer mode, a device ready mode, or a sleep mode;

transmitting, to the auxiliary processor via two state lines, a state output of the fingerprint sensor;

detecting an object contacting a surface of the fingerprint sensor while the application processor is in a low power or sleep mode;

transitioning the state output from a first state to a second state after the detecting, the first state indicating an authentication process of a fingerprint is in progress, the second state indicating successful authentication of the fingerprint, the fingerprint sensor configured to initiate a timer in response to the state output transitioning to the second state;

authenticating the object;

transitioning the state output from the second state to a third state after the authenticating the object and in response to a passing of a duration of time measured by the timer, the third state indicating that the fingerprint sensor is waiting to begin the authentication process; and causing the application processor to exit the low power or sleep mode in response to an actuation of the interrupt control, wherein the auxiliary processor is configured to perform, in response to the state output being in the third state, one or more functions while the application processor remains in the low power or sleep mode, and the application processor is configured to interrupt the authentication process in response to exiting the low power or sleep mode, the interrupt control separate from the application processor, the interrupt control separate from the auxiliary processor.

11. The method of claim 10, wherein the transitioning the state output from the second state to the third state occurs while the application processor remains in the low power or sleep mode.

12. A system, comprising:

a fingerprint sensor;

an application processor connected to the fingerprint sensor via a connection and configured to activate the fingerprint sensor in response to the application processor entering a low power or sleep mode, and to interrupt a fingerprint authentication process in response to exiting the low power or sleep mode, the connection configured to convey a status of at least one of a serial peripheral interface transfer mode, a device ready mode, or a sleep mode;

an auxiliary processor connected to the fingerprint sensor via two state lines and configured to receive a state output from the fingerprint sensor, the fingerprint sensor configured to change the state output to indicate a successful completion of the fingerprint authentication process while retaining data used during the fingerprint authentication process within the fingerprint sensor, the fingerprint sensor configured to change the state output while the application processor remains in the low power or sleep mode, the state output comprising a first state indicating the authentication process of a fingerprint is in progress, a second state indicating successful authentication of the fingerprint, and a third state indicating that the fingerprint sensor is waiting to begin the authentication process, the fingerprint sensor configured to initiate a timer in response to the state output transitioning to the second state, the state output configured to transition from the second state to the third state in response to a passing of a duration of time measured by the timer; and an interrupt control configured to cause the application processor to exit the low power or sleep mode in response to an actuation of the interrupt control, the interrupt control separate from the application processor, the interrupt control separate from the auxiliary processor.

13. The system of claim 12, the auxiliary processor configured to actuate one of a visible output, a haptic output, an audio output, or combinations thereof in response to the state output changing.

* * * * *